(12) United States Patent
Oh (10) Patent No.: US 12,246,721 B2
(45) Date of Patent: Mar. 11, 2025

(54) METHOD OF CONTROLLING DRIVING OF VEHICLE

(71) Applicants: Hyundai Motor Company, Seoul (KR); Kia Corporation, Seoul (KR)

(72) Inventor: Ji Won Oh, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 188 days.

(21) Appl. No.: 18/081,359

(22) Filed: Dec. 14, 2022

(65) Prior Publication Data

US 2024/0075936 A1   Mar. 7, 2024

(30) Foreign Application Priority Data

Sep. 6, 2022 (KR) .................. 10-2022-0112551

(51) Int. Cl.
*B60W 30/182* (2020.01)
*B60W 10/16* (2012.01)
*B60W 40/114* (2012.01)
*B60W 50/08* (2020.01)

(52) U.S. Cl.
CPC .......... *B60W 30/182* (2013.01); *B60W 10/16* (2013.01); *B60W 40/114* (2013.01); *B60W 50/082* (2013.01); *B60W 2540/18* (2013.01); *B60W 2710/12* (2013.01); *B60W 2720/30* (2013.01)

(58) Field of Classification Search
None
See application file for complete search history.

(56) References Cited

U.S. PATENT DOCUMENTS

| | | | |
|---|---|---|---|
| 5,079,708 A * | 1/1992 | Brown ................... | B60K 23/04 701/72 |
| 6,909,959 B2 * | 6/2005 | Hallowell ............. | B60W 30/02 701/91 |
| 7,743,874 B2 * | 6/2010 | Yasui ................... | B62D 5/0472 701/41 |
| 9,290,176 B2 * | 3/2016 | Yamashita ...... | B60W 30/18145 |
| 9,725,014 B2 * | 8/2017 | Honda ................ | G05D 1/021 |
| 9,925,871 B2 * | 3/2018 | Tamura ............. | B60K 23/0808 |
| 10,065,527 B2 * | 9/2018 | Honda ................. | B60W 20/10 |
| 10,513,178 B2 * | 12/2019 | Alfredson ............. | B60K 17/16 |
| 10,583,824 B2 * | 3/2020 | Sasaki ................. | B60K 17/046 |
| 10,821,838 B2 * | 11/2020 | Ienaga ................ | B60L 15/2054 |
| 10,870,356 B2 * | 12/2020 | Yokoyama ............... | H02P 5/51 |
| 10,899,237 B2 * | 1/2021 | Torres ................. | B60L 15/2036 |
| 11,279,230 B2 * | 3/2022 | O'Rourke ............. | B60K 23/04 |
| 11,318,946 B2 * | 5/2022 | Velazquez Alcantar ...... | B60W 10/188 |
| 11,584,224 B2 * | 2/2023 | O'Rourke ............ | B60K 17/356 |
| 11,787,466 B2 * | 10/2023 | Kim ................ | B60W 30/18172 701/41 |

(Continued)

*Primary Examiner* — Kevin R Steckbauer
(74) *Attorney, Agent, or Firm* — Morgan, Lewis & Bockius LLP (57) ABSTRACT

A method of controlling driving of a vehicle which performs torque command tracking control includes distributing a required torque command to a left wheel torque command and a right wheel torque command, correcting each of the distributed torque commands using the differential control amount according to a vehicle driving mode and steering input information, and then controlling torque applied to the wheel based on the torque command after correction.

17 Claims, 6 Drawing Sheets

(56) References Cited

U.S. PATENT DOCUMENTS

| | | | |
|---|---|---|---|
| 11,801,760 B2* | 10/2023 | Yun | B60L 3/104 |
| 11,858,345 B2* | 1/2024 | Oh | B60W 30/18172 |
| 11,904,842 B2* | 2/2024 | Oh | B60W 30/18172 |
| 12,005,902 B2* | 6/2024 | Diamond | B60W 30/045 |
| 2007/0294008 A1* | 12/2007 | Yasui | B62D 5/0472 |
| | | | 701/41 |
| 2015/0283918 A1* | 10/2015 | Honda | B60W 10/16 |
| | | | 903/909 |
| 2016/0023654 A1* | 1/2016 | Yamashita | B60W 30/18145 |
| | | | 701/69 |
| 2016/0090004 A1* | 3/2016 | Ienaga | B60L 3/102 |
| | | | 701/22 |
| 2016/0297300 A1* | 10/2016 | Tamura | B60K 23/0808 |
| 2017/0008422 A1* | 1/2017 | Honda | B60W 20/15 |
| 2018/0154882 A1* | 6/2018 | Sasaki | B60K 6/52 |
| 2018/0162223 A1* | 6/2018 | Alfredson | B60K 17/16 |
| 2018/0264950 A1* | 9/2018 | Yokoyama | B60L 15/2045 |
| 2020/0207332 A1* | 7/2020 | Chatzikomis | B60L 7/00 |
| 2020/0324770 A1* | 10/2020 | Velazquez Alcantar | B60W 10/16 |
| 2021/0188252 A1* | 6/2021 | Lu | B60W 40/12 |
| 2021/0213935 A1* | 7/2021 | Lu | B60C 23/04 |
| 2021/0394823 A1* | 12/2021 | Kim | B60W 50/00 |
| 2022/0024306 A1* | 1/2022 | O'Rourke | B60K 17/354 |
| 2022/0203828 A1* | 6/2022 | O'Rourke | B60K 23/04 |
| 2023/0021908 A1* | 1/2023 | Trainham | B62D 9/002 |
| 2023/0133240 A1* | 5/2023 | Oh | B60W 30/18172 |
| | | | 475/86 |
| 2023/0134424 A1* | 5/2023 | Oh | B60W 30/045 |
| | | | 701/69 |
| 2023/0137189 A1* | 5/2023 | Oh | B60W 10/04 |
| | | | 701/80 |
| 2023/0137834 A1* | 5/2023 | Oh | B60W 30/18172 |
| | | | 701/69 |
| 2023/0150374 A1* | 5/2023 | Yun | B60L 3/102 |
| | | | 475/150 |
| 2023/0286494 A1* | 9/2023 | Park | B60W 10/08 |
| 2023/0398880 A1* | 12/2023 | Yamasaki | B60L 3/0061 |
| 2024/0075936 A1* | 3/2024 | Oh | B60W 30/045 |
| 2024/0116519 A1* | 4/2024 | Oh | B60W 10/20 |
| 2024/0199027 A1* | 6/2024 | Yoon | B60W 10/08 |
| 2024/0227808 A1* | 7/2024 | Lo | B60W 50/035 |

\* cited by examiner

METHOD OF CONTROLLING DRIVING OF VEHICLE

CROSS-REFERENCE TO RELATED APPLICATION

The present application claims priority to Korean Patent Application No. 10-2022-0112551 filed on Sep. 6, 2022, the entire contents of which is incorporated herein for all purposes by this reference.

BACKGROUND OF THE PRESENT DISCLOSURE

Field of the Present Disclosure

The present disclosure relates to a method of controlling driving of a vehicle. More particularly, it relates to a method configured for controlling vehicle driving so that handling responsiveness is differentiated in association with a driving mode of the vehicle, steering input information of a driver, etc.

Description of Related Art

As is known, handling responsiveness (lateral movement performance) of a vehicle is one important factor in determining tendency and characteristics of the vehicle.

In general, a vehicle having a disposition to be comfort is designed to improve ride comfort by suppressing roll motion rather than handling responsiveness. Conversely, a vehicle having a disposition to be sporty is designed to maximize handling responsiveness rather than suppressing roll motion.

In the case of a vehicle provided with an in-wheel motor (that is, an in-wheel motor vehicle), the above-described handling responsiveness may be maximized using a torque distribution function between left and right wheels, or, conversely, roll motion may be actively suppressed using yaw damping, which is considered a specialized advantage of the in-wheel motor vehicle.

Conventionally, a plurality of techniques has been proposed to improve handling responsiveness of a vehicle through a control strategy of an in-wheel motor mounted on each wheel. However, there is no method to diversify a degree or direction of improvement in handling responsiveness in the same vehicle and apply the degree or direction according to needs of a driver.

Accordingly, even in the same vehicle, there is a demand for a technology that can improve ride comfort through yaw damping or maximize handling responsiveness to emphasize sportiness of driving the vehicle depending on the driving mode.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method configured for controlling vehicle driving so that handling responsiveness is differentiated in association with a driving mode of the vehicle, steering input information of a driver, etc.

The object of the present disclosure is not limited to the object mentioned above, and other objects not mentioned herein may be clearly understood by those of ordinary skill in the art to which an exemplary embodiment of the present disclosure belongs (hereinafter referred to as "person of ordinary skill") from the description below.

Various aspects of the present disclosure are directed to providing a method of controlling driving of a vehicle, the method including determining, by a controller, a required torque command when the vehicle is turning, determining, by the controller, a differential control amount for generating a difference in torque applied between a left wheel and a right wheel of the vehicle based on steering input information of a driver when the vehicle is turning, distributing, by the controller, the required torque command to a left wheel torque command and a right wheel torque command, correcting, by the controller, the distributed left wheel torque command and the distributed right wheel torque command using the determined differential control amount, and controlling, by the controller, the torque applied to the left wheel and the torque applied to the right wheel when the vehicle is turning based on a corrected final left wheel torque command and a corrected right wheel torque command.

Various aspects of the present disclosure are directed to providing a method of controlling driving of a vehicle, the method including determining, by a controller, a required torque command when the vehicle is turning, determining, by the controller, a differential control amount for generating a difference in torque applied between a left wheel and a right wheel of the vehicle based on a vehicle driving mode when the vehicle is turning, distributing, by the controller, the required torque command to a left wheel torque command and a right wheel torque command, correcting, by the controller, the distributed left wheel torque command and the distributed right wheel torque command using the determined differential control amount, and controlling, by the controller, the torque applied to the left wheel and the torque applied to the right wheel when the vehicle is turning based on the corrected left wheel torque command and the corrected right wheel torque command.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Hereinafter, the present disclosure will be described in detail with reference to the accompanying drawings. Specific structural or functional descriptions presented in the exemplary embodiments of the present disclosure are only illustrative for describing embodiments according to the concept of the present disclosure, and the exemplary embodiments according to the concept of the present disclosure may be implemented in various forms. Furthermore, the present disclosure should not be construed as being limited to the exemplary embodiments described herein, and should be understood to include all modifications, equivalents, and substitutes included in the spirit and scope of the present disclosure.

Meanwhile, in an exemplary embodiment of the present disclosure, even though terms such as "first," "second," etc. may be used to describe various elements, the elements are not limited by these terms. These terms are only used to distinguish one element from another. For example, within the scope not departing from the scope of rights according to the concept of the present disclosure, a first element may be referred to as a second element, and similarly, the second element may be referred to as the first element.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween. Other expressions for describing a relationship between elements, that is, expressions such as "between" and "immediately between" or "adjacent to" and "directly adjacent to," should be interpreted similarly.

Like reference numerals refer to like elements throughout. The terminology used herein is for describing the embodiments, and is not intended to limit the present disclosure. In the present specification, a singular expression includes the plural form unless the context clearly dictates otherwise. Referring to expressions "comprises" and/or "comprising" used in the specification, a mentioned component, step, operation, and/or element does not exclude the presence or addition of one or more other components, steps, operations, and/or elements.

Figure 1:
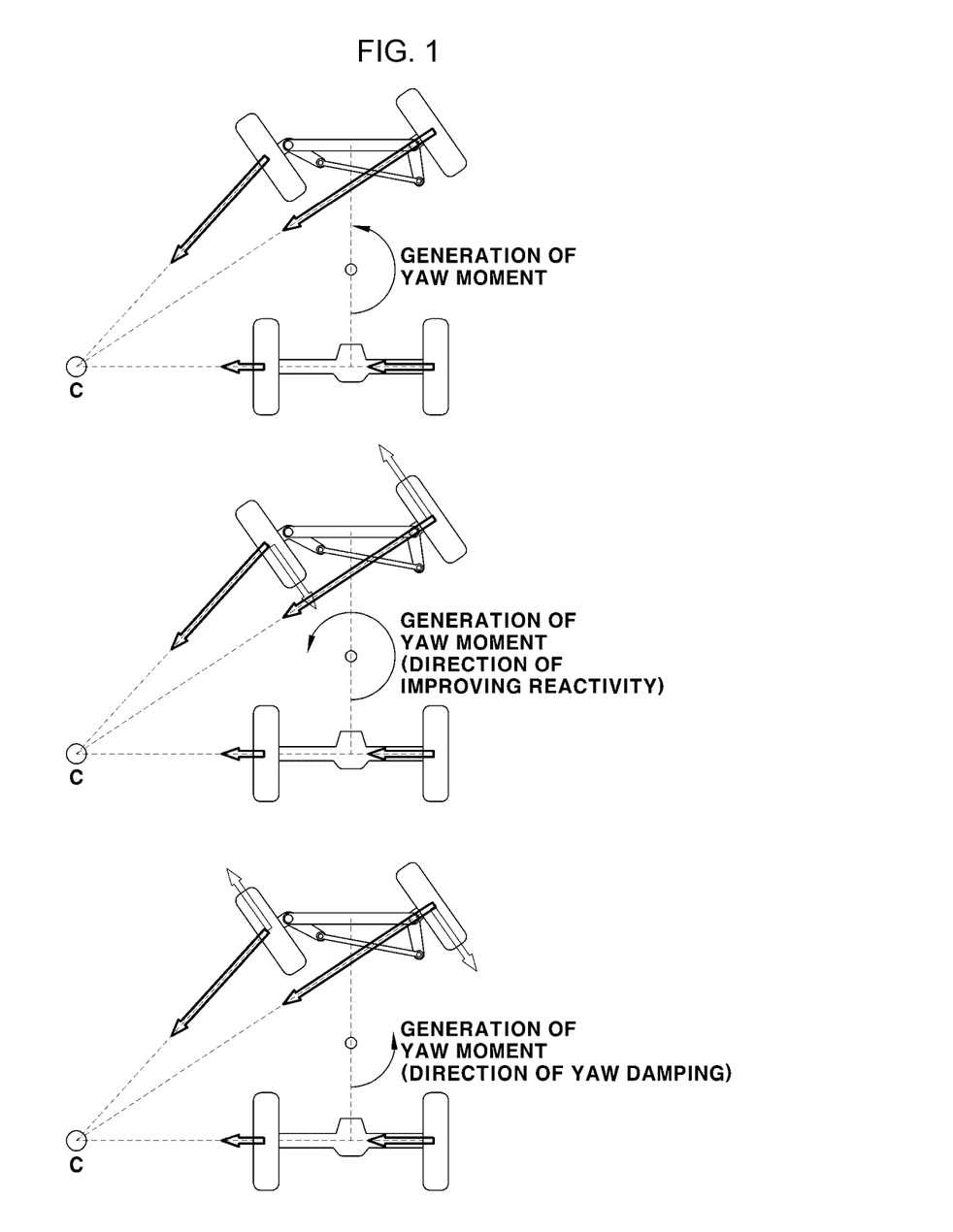
FIG. 1 is a diagram illustrating various turning states of a vehicle.

FIG. 1 is a diagram illustrating various turning states of a vehicle, where "C" indicates a turning center of the vehicle. Hereinafter, a basic principle of the present disclosure will be first described to assist in understanding of the present disclosure. Hereinafter, an example of an in-wheel motor vehicle will be described.

In an exemplary embodiment of the present disclosure, handling means driving (steering) the vehicle by a driver, and the handling input may include driving input of the driver. For example, the handling input may include steering input according to steering wheel operation of the driver, accelerator pedal input according to accelerator pedal operation, brake pedal input according to brake pedal operation, etc.

Furthermore, in an exemplary embodiment of the present disclosure, the handling responsiveness refers to responsiveness of the vehicle exhibited according to handling input of the driver, and may indicate, for example, lateral movement performance of the vehicle.

Furthermore, the present disclosure is applicable to a vehicle capable of generating a difference in torque applied between a left wheel and a right wheel, and is applicable to an in-wheel motor vehicle in which torque applied to each of the left and right wheels may be individually controlled by an in-wheel motor mounted on each wheel.

Alternatively, the present disclosure is applicable to a vehicle provided with a torque distribution control device such as a differential mechanism (differential) or a torque vectoring apparatus configured for generating a difference in applied torque between the left wheel and the right wheel.

In controlling torque applied to each of the left and right wheels according to handling input of the driver, a basic principle of the present disclosure is to differentiate a direction and magnitude of torque on both sides based on at least one or both of a driving mode of the vehicle and steering input information of the driver.

Here, the torque is torque applied to the wheels (drive wheels) by a driving device for driving the vehicle, and is meant to include both positive (+) torque, which is torque in a direction of accelerating the vehicle, and negative (−) torque, which is torque in a direction of decelerating the vehicle.

Here, the driving device may include a left wheel driving device and a right wheel driving device. The left wheel driving device and the right wheel driving device may be motors for driving a vehicle, and the motor may be an in-wheel motor mounted on each wheel.

That is, in the in-wheel motor vehicle, the driving device includes in-wheel motors each mounted on each wheel to apply torque to the corresponding wheel, and may include a left wheel in-wheel motor for applying torque to the left wheel and a right wheel in-wheel motor for applying torque to the right wheel.

Furthermore, the left wheel in-wheel motor may include an in-wheel motor mounted on the left wheel of the front wheels and an in-wheel motor mounted on the left wheel of the rear wheels, and the right wheel in-wheel motor may include an in-wheel motor mounted on the right wheel of the front wheels and an in-wheel motor mounted on the right wheel of the rear wheels.

Positive (+) and negative (−) in the torque indicate directions of the torque. In the following description, "torque" is torque applied to the vehicle wheel, and is torque for driving the vehicle wheel regardless of whether the direction is a positive (+) direction or a negative (−) direction, and thus "torque" may be replaced with "driving torque."

However, because negative (−) torque applied to the wheel in the direction of decelerating the vehicle is braking torque, positive (+) torque may be referred to as "driving torque," and negative (−) torque may be referred to as "braking torque."

Accordingly, in an exemplary embodiment of the present disclosure, the torque includes the driving torque and the braking torque, and thus force due to the torque may be the sum of the forces acting between a tire of the wheel and a road surface.

Furthermore, in the following description, "torque" may be replaced with "driving force," which is a force generated by the torque, or a force generated by positive direction (+) torque may be referred to as a "driving force," and a force generated by negative direction (−) torque may be referred to as a "braking force."

Furthermore, in an exemplary embodiment of the present disclosure, the left wheel refers to all wheels on the left side of the vehicle, and may include, for example, the left wheel of the front wheels and the left wheel of the rear wheels. Furthermore, in an exemplary embodiment of the present disclosure, the right wheel refers to all wheels on the right side of the vehicle, and may include, for example, the right wheel of the front wheels and the right wheel of the rear wheels.

Accordingly, the left wheel torque is torque obtained by adding all torques applied to all the left wheels of the vehicle, that is, the left wheels of the front and rear wheels, and the right wheel torque is torque obtained by adding all torques applied to all the right wheels of the vehicle, that is, the right wheels of the front and rear wheels.

For example, the left wheel torque may be torque obtained by adding torque applied to the left wheel of the front wheels and torque applied to the left wheel of the rear wheels, and the right wheel torque may be torque obtained by adding torque applied to the right wheel of the front wheels and torque applied to the right wheel of the rear wheels.

This description is similarly applied to the case of a left wheel torque command and a right wheel torque command. The left wheel torque command has a value obtained by adding respective command values of a front left wheel driving device (front left wheel in-wheel motor) and a rear left wheel driving device (rear left wheel in-wheel motor).

Furthermore, the right wheel torque command has a value obtained by adding respective command values of a front right wheel driving device (front right wheel in-wheel motor) and a rear right wheel driving device (rear right wheel in-wheel motor).

The in-wheel motor vehicle is a vehicle that can individually control the torques applied to the left and right wheels, and thus may perform turning using a difference in torque between the left and right wheels in addition to turning by adjusting an Ackerman angle of the wheel.

This means that the turning motion of the vehicle may be induced or suppressed independently of the steering input by steering wheel operation of the driver. Accordingly, in torques applied to the left and right wheels, it is possible to differentiate the turning characteristics or lateral reactivity for each driving mode of the vehicle by appropriately inducing a difference in direction and magnitude of each torque depending on the driving mode of the vehicle.

Figure 2:
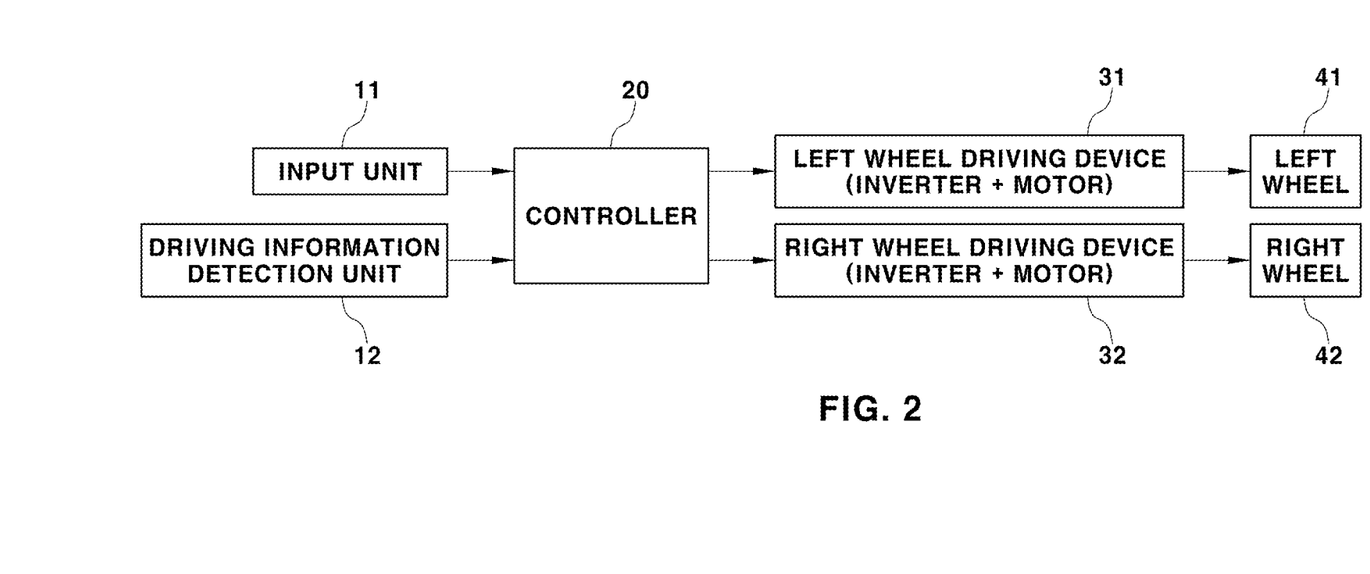
FIG. 2 is a block diagram illustrating a configuration of an apparatus of performing a driving control process according to various exemplary embodiments of the present disclosure.
Figure 3:
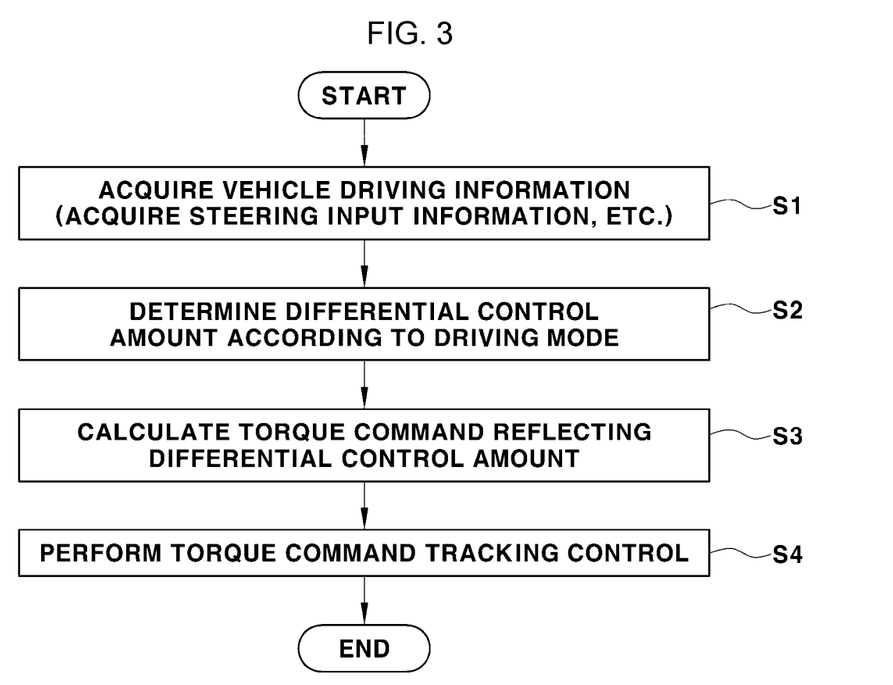
FIG. 3 is a flowchart illustrating the driving control process according to various exemplary embodiments of the present disclosure.

Hereinafter, a control method according to various exemplary embodiments of the present disclosure will be described in detail. FIG. 2 is a block diagram illustrating a configuration of an apparatus of performing a driving control process according to various exemplary embodiments of the present disclosure, and FIG. 3 is a flowchart illustrating the driving control process according to various exemplary embodiments of the present disclosure.

As illustrated in the figure, a driving control device includes a controller 20 that determines a torque command from vehicle driving information and is configured to control torque applied to driving wheels 41 and 42 using the determined torque command, and driving devices 31 and 32 for driving the vehicle and applying controlled torque to the driving wheels 41 and 42 by operating according to the torque command output by the controller 20.

As is known, an electrified vehicle includes a motor as the driving devices 31 and 32, and an inverter for driving and controlling the motor according to a torque command output by the controller 20 together with the motor. In the present way, in a state in which the motor and the inverter are mounted, a battery of the vehicle is connected to the motor through the inverter so that the battery may be charged and discharged.

In an exemplary embodiment of the present disclosure, the driving device of the vehicle includes the left wheel driving device 31 for applying torque to the left wheel 41 and the right wheel driving device 32 for applying torque to the right wheel 42, and each driving device may include a motor and an inverter.

In an exemplary embodiment of the present disclosure, the left wheel driving device 31 may include a left wheel in-wheel motor and an inverter, and the left wheel in-wheel motor may include an in-wheel motor mounted on the left wheel of the front wheels and an in-wheel motor mounted on the left wheel of the rear wheels.

Furthermore, in an exemplary embodiment of the present disclosure, the right wheel driving device 32 may include a right wheel in-wheel motor and an inverter, and the right wheel in-wheel motor may include an in-wheel motor mounted on the right wheel of the front wheels and an in-wheel motor mounted on the right wheel of the rear wheels.

In an exemplary embodiment of the present disclosure, the controller 20 determines required torque based on vehicle driving information collected in real time while driving the vehicle, distributes a torque command (required torque command) for generating the determined required torque to the left wheel torque command and the right wheel torque command, and is configured to control operations of the left wheel driving device 31 and the right wheel driving device 32 according to the distributed torque command.

The controller 20 may include a plurality of controllers that normally performs cooperative control for vehicle driving. For example, the controller 20 may include a vehicle control unit (VCU) that determines a required torque command based on vehicle driving information obtained in real time from the vehicle, and generates and outputs a torque command for each driving device, and a motor control unit (MCU) that is configured to control operations of the left wheel in-wheel motor and the right wheel in-wheel motor according to the torque command for each driving device output by the vehicle controller.

In an exemplary embodiment of the present disclosure, a method of determining the required torque command from the real-time vehicle driving information is not different from a known method of determining the required torque command based on vehicle driving information in a conventional vehicle.

Meanwhile, the driving control device configured for performing the control process according to the exemplary embodiment of the present disclosure may further include an input unit 11 for inputting a vehicle driving mode selected by the driver to the controller 20, and a driving information detection unit 12 for detecting vehicle driving information.

The input unit 11 may be a conventional device which may be operated by the driver to select a driving mode in the vehicle. For example, it is possible to use a device, which can input an electrical signal according to an operation of the driver to the controller 20, such as a button, a switch, a lever, a dial, or a touchscreen.

The driving mode of the vehicle selectable by the input unit 11 may include a comfort mode, a normal mode, and a sports mode. Because these driving modes are well-known modes widely applied to vehicles in recent years, detailed descriptions of tendencies and characteristics of each driving mode will be omitted herein.

Furthermore, the required torque command determined by the controller 20 is determined and generated based on the vehicle driving information collected in real time while driving in the vehicle, and the vehicle driving information may be information detected by the driving information detection unit 12 and input to the controller through a vehicle network.

The driving information detection unit 12 detecting the vehicle driving information may include an accelerator pedal sensor (APS) for detecting an accelerator pedal input value of the driver, a brake pedal sensor (BPS) for detecting a brake pedal input value of the driver, a sensor configured for detecting a speed of a driveline, and a sensor configured for detecting a vehicle speed.

Furthermore, the driving information detection unit 12 may include a steering angle sensor (SAS) for detecting a steering angle according to steering wheel operation of the driver as steering input information and a sensor configured for detecting vehicle acceleration.

A speed of the driveline may include a rotation speed (driving device speed) of each of the driving devices 31 and 32 and a rotation speed (wheel speed, driving wheel speed) of each of the driving wheels 41 and 42 connected to the driving devices to transmit power. Here, the rotation speed of the driving device may be a rotation speed of the motor (motor speed).

In the present instance, the sensor configured for detecting the driveline speed may include a motor speed sensor configured for detecting the motor speed, which may be a resolver for detecting a rotor position of the motor. In an exemplary embodiment of the present disclosure, when the driving devices 31 and 32 are in-wheel motors mounted on the respective wheels 41 and 42, the motor speed sensor may be a sensor configured for detecting the speed of each in-wheel motor, which may be a resolver.

Furthermore, the sensor configured for detecting the driveline speed may be a wheel speed sensor configured for detecting rotation speeds (wheel speeds) of the driving wheels 41 and 42. Furthermore, the sensor configured for detecting the vehicle speed may be a wheel speed sensor. Obtaining vehicle speed information from a signal of the wheel speed sensor is a well-known technique in the art, and thus a detailed description thereof will be omitted. A sensor configured for detecting acceleration (longitudinal acceleration and lateral acceleration) of the vehicle may be a conventional acceleration sensor.

Accordingly, in an exemplary embodiment of the present disclosure, as vehicle driving information detected by the driving information detection unit 12, it is possible to selectively use an accelerator pedal input value (APS value) and a brake pedal input value (BPS value) of the driver, driving device speed (motor speed), driving wheel speed (wheel speed), vehicle speed, steering angle, which is steering input information of the driver, vehicle acceleration, etc.

Furthermore, in an exemplary embodiment of the present disclosure, the required torque may be determined by the controller 20 based on real-time vehicle driving information detected by the driving information detection unit 12 as described above, or may be input from another controller (for example, ADAS controller) in the vehicle to the controller 20 through the vehicle network.

Accordingly, the controller 20 may determine and generate a torque command for each driving wheel according to a requested torque determined based on the vehicle driving information detected by the driving information detection unit 12 or a requested torque input from another controller.

In the present instance, the controller 20 may distribute the required torque command to the left wheel torque command and the right wheel torque command, and then correct the distributed left wheel torque command and right wheel torque command to torque commands that cause left-and-right torque deviation using at least one or the driving mode of the driver and the steering input information of the driver. Here, the steering input information may be steering angle information, which may be a steering angle detected by the steering angle sensor.

As a result, the controller 20 may control operations of the left wheel driving device 31 for applying torque to the left wheel 41 according to the corrected left wheel torque command and right wheel torque command and the right wheel driving device 42 for applying torque to the right wheel 42. That is, as a driving device, each of the left wheel in-wheel motor and the right wheel in-wheel motor may be controlled according to each torque command after correction.

Alternatively, the controller 20 may control an operation of a torque distribution control apparatus configured for generating a difference in applied torque between the left and right wheels rather than the left wheel driving device 31 and the right wheel driving device 32 so that the left and right wheel torque distribution amount may be controlled according to the left wheel torque command and the right wheel torque command after correction.

Meanwhile, as described above, the controller 20 may determine, from a required torque command, a left wheel torque command and a right wheel torque command that selectively generate the difference in applied torque between the left wheel and the right wheel (turning internal wheel and turning external wheel) (hereinafter referred to as "left-and-right torque deviation") according to at least one or both of the driving mode and the steering input information when the vehicle is turning.

A final left wheel torque command and right wheel torque command for selectively generating the left-and-right torque deviation may be determined to be a value obtained by reflecting the differential control amount in a left wheel torque command and a right wheel torque command, to which the required torque command determined based on the real-time vehicle driving information is distributed according to an existing distribution ratio (for example, 1:1), and correcting the value.

Here, the differential control amount is used to correct the left wheel torque command and the right wheel torque command. In various exemplary embodiments of the present disclosure, the differential control amount used for correcting the torque command may be determined based on at least one or both of the driving mode of the vehicle and the steering input information of the driver.

In an exemplary embodiment of the present disclosure, the differential control amount determined as described above is for generating the left-and-right torque deviation during the turning of the vehicle, and may be determined as a torque value corresponding to the left-and-right torque deviation required during turning.

In various exemplary embodiments of the present disclosure, the controller 20 may obtain vehicle driving information by the driving information detection unit 12 (step S1 in FIG. 3), determine a required torque command, and determine the differential control amount to be a value according to the vehicle driving mode selected by the driver (step S2 in FIG. 3).

Accordingly, the differential control amount determined based on the vehicle driving mode in the controller 20 may be used to correct the left and right wheel torque commands distributed from the required torque command.

That is, during the turning of the vehicle, the controller 20 determines a final left wheel torque command and right wheel torque command by correcting each of the left wheel torque command before correction and the right wheel torque command before correction distributed from the required torque command using the differential control amount (step S3 in FIG. 3).

Furthermore, the controller 20 is configured to control the operations of the left wheel driving device 31 and the right wheel driving device 32 according to the determined final torque command, so that the torque of the final command may be applied to the left wheel and the right wheel by each driving device, respectively (step S4 in FIG. 3).

For reference, when the vehicle is turning, one of the left wheel 41 and the right wheel 42 of the vehicle becomes a turning internal wheel and the other one becomes a turning external wheel. It is a well-known fact that, among the left and right wheels, the wheel closest to a turning center (reference numeral "C" in FIG. 1) is the internal wheel, and the wheel far from the turning center is the external wheel.

In various exemplary embodiments of the present disclosure, the driving mode of the vehicle includes a comfort mode, which is a driving mode that prioritizes ride comfort, a sports mode, which is a driving mode that prioritizes movement performance, and a normal mode that provides a ride comfort and movement performance at a level between the comfort mode and the sports mode.

In various exemplary embodiments of the present disclosure, when the current driving mode is the comfort mode, the differential control amount is determined in the controller 20 in a direction to induce a yaw damping effect, each of the left wheel torque command before correction and the right wheel torque command before correction are corrected using the determined differential control amount, so that a left-and-right torque deviation equal to the above-described differential control amount may occur between the left wheel 41 and the right wheel 42.

That is, torques are applied to the left wheel 41 and the right wheel 42 according to the final left wheel torque command after correction and the final right wheel torque command after correction, and the left-and-right torque deviation is generated between the torque applied to the left wheel and the torque applied to the right wheel. In the present instance, the differential control amount used for correcting the torque command may be the same value as the left-and-right torque deviation.

Furthermore, when the current driving mode is the sports mode, the controller 20 determines the vehicle control amount in a direction to induce a yaw moment reinforcement effect, and each of the left wheel torque command before correction and the right wheel torque command before correction is corrected based on the determined differential control amount, so that a left-and-right torque deviation equal to the above-described differential control amount may be generated between the left wheel 41 and the right wheel 42.

Furthermore, when the current driving mode is a normal mode that aims for drivability and performance at a level between the comfort mode and the sports mode, the controller 20 may determine the differential control amount to be a value between the differential control amount in the comfort mode and the differential control amount in the sports mode. For example, the differential control amount in the normal mode may be determined to be an intermediate value between the differential control amount in the comfort mode and the differential control amount in the sports mode.

In the present way, the left-and-right torque deviation generated in the normal mode is located between the left-and-right torque deviation generated in the comfort mode and the left-and-right torque deviation generated in the sports mode.

Alternatively, it is possible to prevent the left-and-right t torque deviation from occurring in the normal mode. In the instant case, in the normal mode, the left wheel torque command and the right wheel torque command distributed from the required torque command are not corrected. For example, the final left wheel torque command and the final right wheel torque command may be determined to be the same command values distributed 1:1 from the required torque command.

Furthermore, when a single or a plurality of modes that provides drivability and performance at a level between the divided modes is additionally set among the divided comfort mode, normal mode, and sports mode, the differential control amount of each of the added driving modes may be determined using an interpolation method from values of the three divided modes.

Furthermore, in an exemplary embodiment of the present disclosure, in any driving mode, the differential control amount and the left-and-right torque deviation are not generated at all times, and are generated only in a vehicle turning situation where the driver operates the steering wheel and there is a steering input. That is, the driving control process of the present disclosure for generating the left-and-right torque deviation regardless of the driving mode is not performed in a straight-line driving condition of the vehicle.

Furthermore, in another exemplary embodiment of the present disclosure, the controller 20 may determine the differential control amount to be a value according to steering input information of the driver. Here, the steering input information may be steering angle information obtained from a signal of a steering angle sensor of the driving information detection unit 12, which may be a steering angle or information obtained by further processing the steering angle.

In the present instance, the controller 20 may be set to determine the differential control amount to be a function of the steering angle information and a derivative of a value thereof. Equation 1 below is an example of an equation configured for determining a differential control amount using steering angle information and a derivative of the steering angle information.

$$\Delta T_{diff} = C_0 \delta + C_1 \dot{\delta} + C_2 \ddot{\delta} + C_3 \dddot{\delta} + \quad \text{[Equation 1]}$$

In Equation 1, $\Delta T_{diff}$ denotes the differential control amount, $\delta$ denotes a value of steering angle information, and $C_0$, $C_1$, $C_2$, and $C_3$ denote preset coefficients. According to Equation 1, a value obtained by multiplying steering angle information and derivatives of the steering angle information by the coefficients as weights, respectively, is determined to be the differential control amount.

Furthermore, the controller 20 may be set to determine the differential control amount using a transfer function to which steering angle information is input as illustrated in Equation 2 below.

$$\frac{\Delta T_{diff}}{\delta} = \frac{C_{N0} + C_{N1}s + C_{N2}s^2 + C_{N3}s^3 + \ldots}{C_{D0} + C_{D1}s + C_{D2}s^2 + C_{D3}s^3 + \ldots} \qquad \text{[Equation 2]}$$

In Equation 2, $C_{N0}$, $C_{N1}$, $C_{N2}$, $C_{N3}$, $C_{D0}$, $C_{D1}$, $C_{D2}$, and $C_{D3}$ denote preset coefficients.

Accordingly, the controller 20 may determine the differential control amount using one of Equations 1 and 2 above.

In determining the differential control amount using Equation 1 or Equation 2, preset coefficients need to be set and used, and values of the coefficients may be values irrespective of the driving mode. However, in another exemplary embodiment of the present disclosure, the values of the coefficients may be set to different values according to the driving mode. In the present instance, the coefficients may be defined as weights set according to the driving mode.

When the differential control amount is determined using the coefficients determined for each driving mode, the determined differential control amount may be a value determined in association with the vehicle driving mode selected by the driver and the steering input information (steering angle information) of the driver.

As in the examples of Equations 1 and 2, a transfer function between the steering angle information and the differential control amount is used, or after multiplying the steering angle information and a derivative term of the value by a weight set according to each driving mode, the summed value may be determined to be the differential control amount.

In the present exemplary embodiment of the present disclosure, when the differential control amount in a yaw moment strengthening direction is defined as a positive control amount, and the differential control amount in a yaw damping direction is defined as a negative control amount, the differential control amount may be set to be a negative (−) value in the comfort mode, and the differential control amount may be set to be a positive (+) value in the sports mode. In the present instance, in the case of the normal mode, the differential control amount for correcting the torque command may be determined as a value of "0."

That is, in the normal mode, "0" is used as the differential control amount, and the left wheel torque command and the right wheel torque command distributed from the required torque command are used as the final torque command for each wheel without correction (torque command is not corrected).

Accordingly, when the driving mode of the vehicle is the normal mode, the uncorrected torque command for each wheel is used without change. Accordingly, the torque corresponding to the command in an uncorrected state may be applied to each of the left wheel and the right wheel.

Figure 4A:
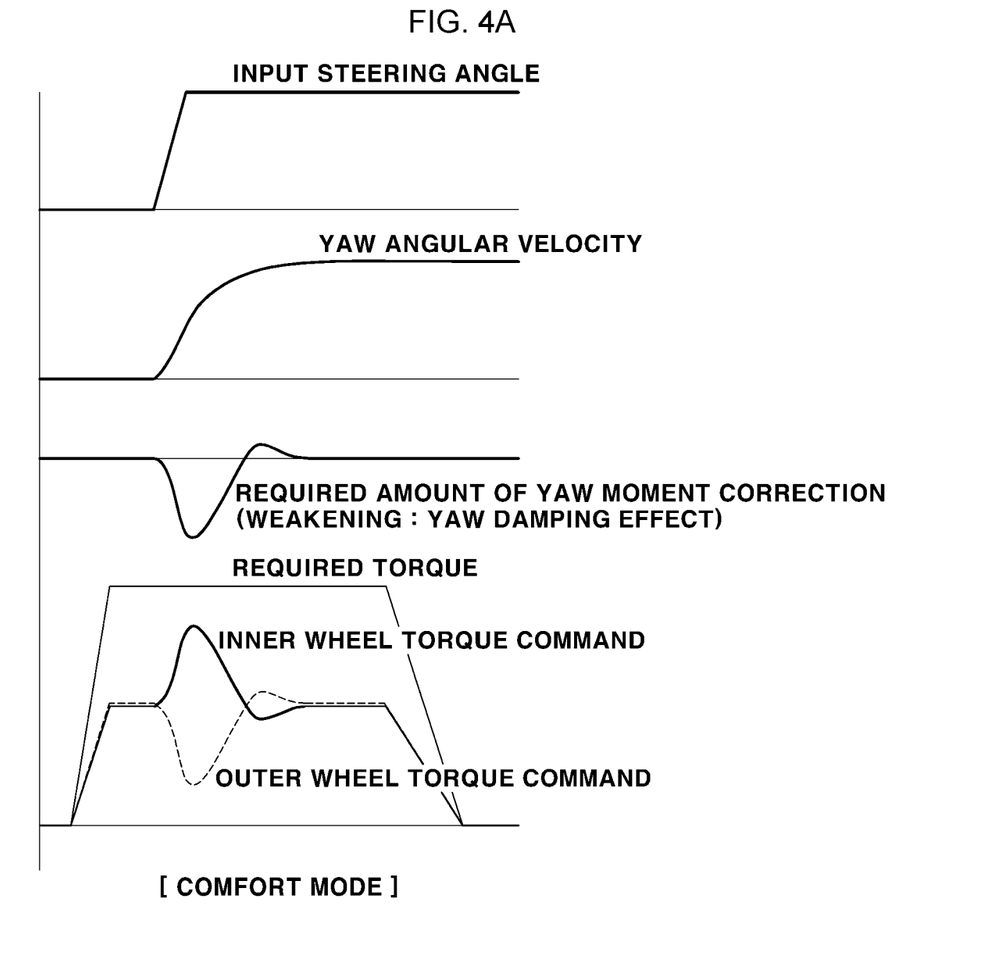
FIG. 4A is a diagram illustrating an example in which a torque command for each wheel is determined when a driving mode of the vehicle is a comfort mode by a driving control method according to various exemplary embodiments of the present disclosure.
Figure 4B:
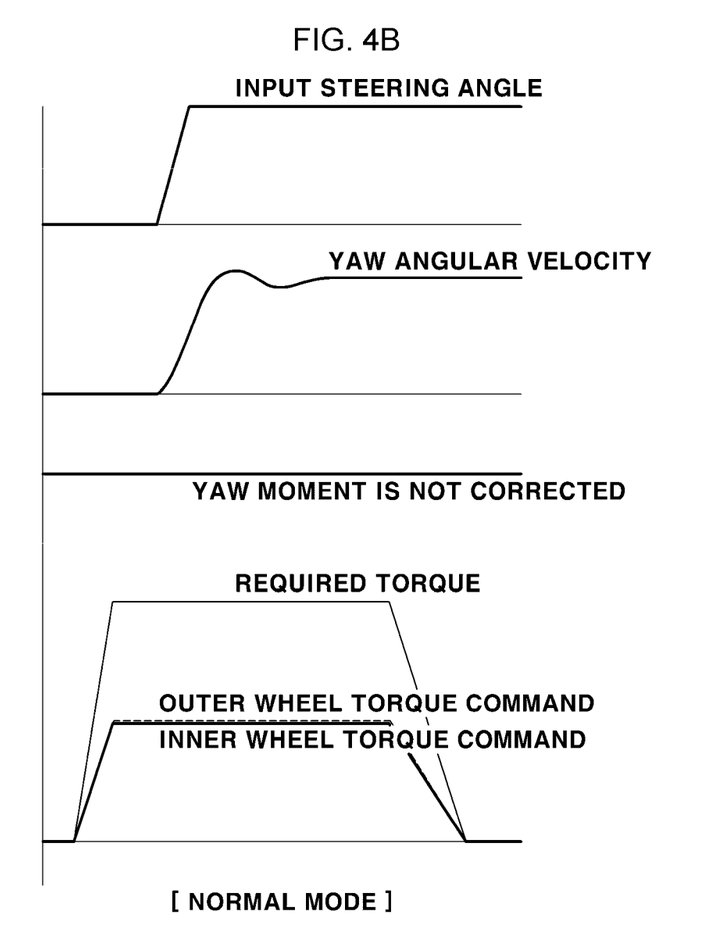
FIG. 4B is a diagram illustrating an example in which a torque command for each wheel is determined when a driving mode of the vehicle is a normal mode by the driving control method according to various exemplary embodiments of the present disclosure.
Figure 4C:
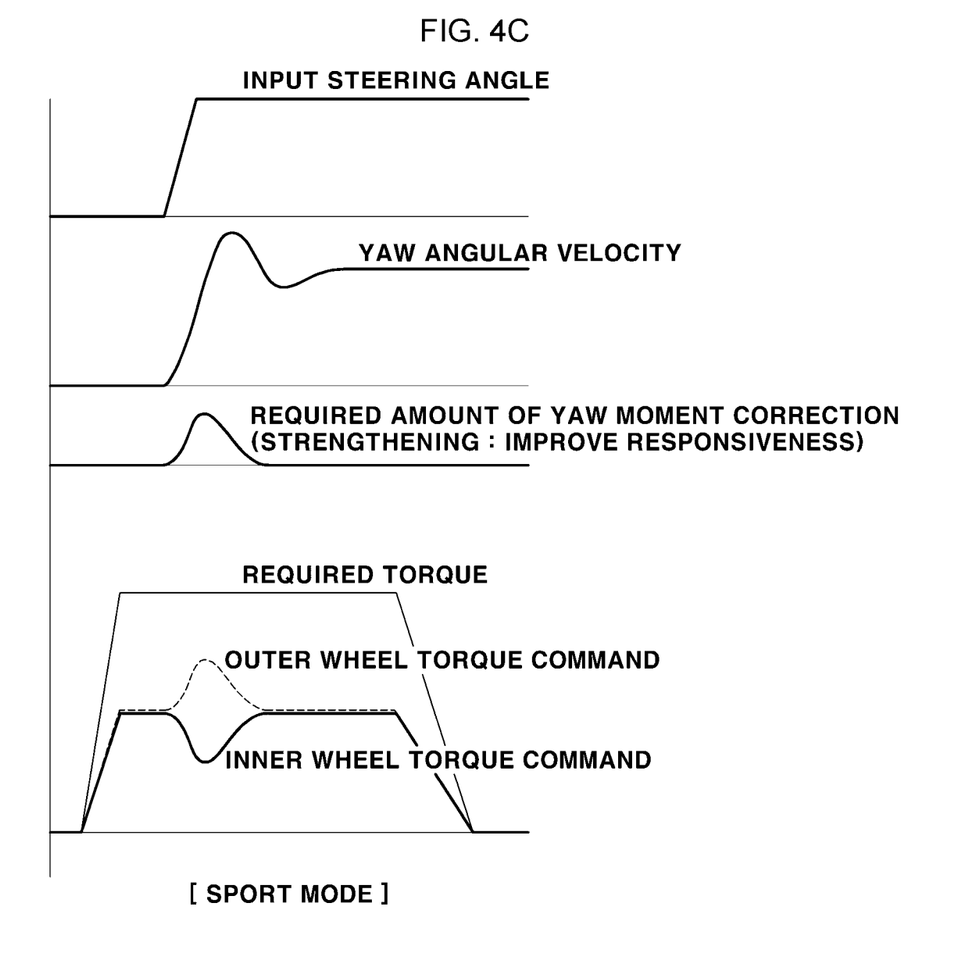
FIG. 4C is a diagram illustrating an example in which a torque command for each wheel is determined when a driving mode of the vehicle is a sports mode by the driving control method according to various exemplary embodiments of the present disclosure.

FIG. 4A, FIG. 4B and FIG. 4C are diagrams each illustrating an example in which a torque command for each wheel is determined according to a driving mode of the vehicle in an exemplary embodiment of the present disclosure. FIG. 4A illustrates the case where the driving mode of the vehicle is the comfort mode, FIG. 4B illustrates the case where the driving mode of the vehicle is the normal mode, and FIG. 4C illustrates the case where the driving mode of the vehicle is the sports mode.

In each figure, the "required correction amount" represents the torque correction amount, and may refer to a value corresponding to the differential control amount (which is a value of ½ of the differential control amount). Furthermore, a state of a yaw angular velocity for each driving mode is illustrated in each drawing. A method of determining the yaw angular velocity using real-time lateral acceleration and a vehicle speed detected by a sensor, etc. has been known as a method of determining the yaw angular velocity.

In the exemplary embodiment of the present disclosure, the differential control amount may be set to be a negative (−) value in the comfort mode, and the differential control amount may be set to a positive (+) value in the sports mode. In the present instance, in the case of the normal mode, the differential control amount may be determined to be a value of 0.

As a result, as illustrated in FIG. 4A, in the comfort mode, the differential control amount may be determined to be a negative (−) value to weaken the yaw moment and obtain a yaw damping effect. Furthermore, as illustrated in FIG. 4C, in the sports mode, the differential control amount may be determined to be a positive (+) value to obtain effects of strengthening the yaw moment and improving handling responsiveness.

Furthermore, the driving control process of the vehicle according to an exemplary embodiment of the present disclosure is performed while the vehicle is turning. Therefore, when one of the left and right wheels of the vehicle is the turning internal wheel, and the other one is the turning external wheel, in both the comfort mode and the sports mode, the internal wheel torque command may be corrected by subtracting ½ of the differential control amount (torque correction amount), and the external wheel torque command may be corrected by adding ½ of the differential control amount (torque correction amount).

Accordingly, in the comfort mode and the sports mode, the differential control amount may be reflected in each of the left wheel torque command and the right wheel torque command by ½ of the value. In the present instance, the sum of the left wheel torque command after correction and the right wheel torque command after correction becomes the required torque command.

As a result, the operations of the left wheel driving device 31 and the right wheel driving device 32 are controlled according to each torque command, so that a torque difference equal to the differential control amount (left-and-right torque deviation) is generated between the left wheel 41 and the right wheel 42 while allowing the total torque to maintain the required torque.

Furthermore, as illustrated in 4C, in the normal mode, the differential control amount may be determined to be 0 for no yaw moment correction. Accordingly, in the normal mode, the internal wheel torque command and the external wheel torque command determined by distributing the required torque command may be determined to be a final torque command without correction.

In the present way, in a method of controlling driving of the vehicle according to an exemplary embodiment of the present disclosure, the required torque command is distributed to the left wheel torque command and the right wheel torque command, and each of the distributed torque commands is corrected with the differential control amount according to the driving mode of the vehicle and the steering input information of the driver.

Accordingly, by performing torque command tracking control for controlling the torque applied to the wheel based on the torque command after correction, torque having a left-and-right deviation equal to the differential control amount may be applied to the left and right wheels of the vehicle.

As a result, according to the method of controlling driving of the vehicle according to an exemplary embodiment of the present disclosure, the handling responsiveness (lateral movement performance) of the vehicle may be differentiated according to the vehicle driving mode and the steering input information of the driver. It becomes possible to provide significantly differentiated handling responsiveness according to driving modes in the same vehicle without additional hardware or cost.

The method of controlling driving of the present disclosure not only resolves the existing trade-off between ride comfort and handling performance, but also differentiates characteristics of handling performance for each driving mode, so that it becomes possible to satisfy handling performance at a level desired by customers, which contributes to improving marketability of the vehicle.

Accordingly, in the method of controlling driving of the vehicle according to an exemplary embodiment of the present disclosure, the required torque command is distributed to the left wheel torque command and the right wheel torque command, and each of the distributed torque commands is corrected using the differential control amount according to the vehicle driving mode and the steering input information, so that torque having a left-and-right deviation equal to the differential control amount may be applied to the left and right wheels of the vehicle.

As a result, according to the method of controlling driving of the vehicle according to an exemplary embodiment of the present disclosure, the handling responsiveness (lateral movement performance) of the vehicle may be differentiated according to the vehicle driving mode and the steering input information of the driver. It becomes possible to provide significantly differentiated handling responsiveness according to driving modes in the same vehicle without additional hardware or cost.

The method of controlling driving of the present disclosure not only resolves the existing trade-off between ride comfort and handling performance, but also differentiates characteristics of handling performance for each driving mode, so that it becomes possible to satisfy handling performance at a level desired by customers, which contributes to improving marketability of the vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling driving of a vehicle, the method comprising:
   determining, by a controller, a required torque command when the vehicle is turning;
   determining, by the controller, a differential control amount for generating a difference in torque applied between a left wheel and a right wheel of the vehicle based on steering input information of a driver when the vehicle is turning;
   distributing, by the controller, the required torque command to a left wheel torque command and a right wheel torque command;
   correcting, by the controller, the distributed left wheel torque command and the distributed right wheel torque command using the determined differential control amount; and
   controlling, by the controller, the torque applied to the left wheel and the torque applied to the right wheel when the vehicle is turning based on a corrected final left wheel torque command and a corrected right wheel torque command,
   wherein the determining of the differential control amount includes determining the differential control amount to be a function of steering angle information and a derivative of the steering angle information as the steering input information of the driver, and
   wherein the differential control amount is determined to be a value obtained by multiplying terms of the steering angle information and the derivative of the steering angle information by preset coefficients, respectively, and adding the terms.

2. The method of claim 1, wherein each of the preset coefficients is set to a value according to a vehicle driving mode.

3. The method of claim 1,
   wherein the correcting of the distributed left wheel torque command and the distributed right wheel torque command includes correcting each of the distributed left wheel torque command and the distributed right wheel torque command by a value of ½ of the differential control amount, and
   wherein the controlling of the torque applied to the left wheel and the torque applied to the right wheel includes setting the difference in the torque applied between the left wheel and the right wheel to be the differential control amount.

4. The method of claim 3, wherein, in the left wheel and the right wheel, a turning internal wheel torque command is corrected by subtracting ½ of the differential control amount, and a turning external wheel torque command is corrected by adding ½ of the differential control amount.

5. The method of claim 4, wherein the distributing includes distributing the required torque command to the left wheel torque command and the right wheel torque command by a distribution ratio of 1:1.

6. The method of claim 1, wherein the determining of the differential control amount includes determining, by the controller, the differential control amount based on the steering input information and vehicle driving information further using a vehicle driving mode in addition to the steering input information when the vehicle is turning.

7. The method of claim 6, wherein the vehicle driving mode is a driving mode selected by the driver, and includes a comfort mode, a normal mode, and a sports mode.

8. The method of claim 7, wherein, when the differential control amount in a yaw moment reinforcement direction is defined as a positive control amount, and the differential control amount in a yaw damping direction is defined as a negative control amount, the determining of the differential control amount includes determining the differential control amount to be a negative (−) value when the vehicle driving mode is the comfort mode during the turning of the vehicle, and determining the differential control amount to be a positive (+) value when the vehicle driving mode is the sports mode during the turning of the vehicle.

9. The method of claim 7,
   wherein the determining of the differential control amount includes determining the differential control amount to a value of "0" when the vehicle driving mode is the normal mode during the turning of the vehicle, and
   wherein the correcting includes determining the distributed left wheel torque command and the distributed right wheel torque command to a final left wheel torque command and a final right wheel torque command, respectively, without change.

10. A method of controlling driving of a vehicle, the method comprising:
    determining, by a controller, a required torque command when the vehicle is turning;
    determining, by the controller, a differential control amount for generating a difference in torque applied between a left wheel and a right wheel of the vehicle based on steering input information of a driver when the vehicle is turning;
    distributing, by the controller, the required torque command to a left wheel torque command and a right wheel torque command;
    correcting, by the controller, the distributed left wheel torque command and the distributed right wheel torque command using the determined differential control amount; and
    controlling, by the controller, the torque applied to the left wheel and the torque applied to the right wheel when the vehicle is turning based on a corrected final left wheel torque command and a corrected right wheel torque command,
    wherein the determining of the differential control amount includes determining the differential control amount using a transfer function to which steering angle information is input.

11. The method of claim 10, wherein the differential control amount is determined by the following Equation E1:

$$\frac{\Delta T_{diff}}{\delta} = \frac{C_{N0} + C_{N1}s + C_{N2}s^2 + C_{N3}s^3 + \ldots}{C_{D0} + C_{D1}s + C_{D2}s^2 + C_{D3}s^3 + \ldots} \quad \text{E1}$$

where $\Delta T_{diff}$ denotes the differential control amount, $\delta$ denotes a value of the steering angle information, and each of $C_{N0}$, $C_{N1}$, $C_{N2}$, $C_{N3}$, $C_{D0}$, $C_{D1}$, $C_{D2}$, and $C_{D3}$ denotes a preset coefficient.

12. The method of claim 11, wherein each of the coefficients is set to a value according to a vehicle driving mode.

13. A method of controlling driving of a vehicle, the method comprising:

determining, by a controller, a required torque command when the vehicle is turning;

determining, by the controller, a differential control amount for generating a difference in torque applied between a left wheel and a right wheel of the vehicle based on a vehicle driving mode when the vehicle is turning;

distributing, by the controller, the required torque command to a left wheel torque command and a right wheel torque command;

correcting, by the controller, the distributed left wheel torque command and the distributed right wheel torque command using the determined differential control amount; and controlling, by the controller, the torque applied to the left wheel and the torque applied to the right wheel when the vehicle is turning based on the corrected left wheel torque command and the corrected right wheel torque command, wherein the vehicle driving mode is a driving mode selected by a driver, and includes a normal mode, wherein the determining of the differential control amount includes determining the differential control amount to a value of "0" when the vehicle driving mode is the normal mode during the turning of the vehicle, and wherein the correcting includes determining the distributed left wheel torque command and the distributed right wheel torque command to a final left wheel torque command and a final right wheel torque command, respectively, without change.

14. The method of claim 13, wherein the correcting of the distributed left wheel torque command and the distributed right wheel torque command includes correcting each of the distributed left wheel torque command and the distributed right wheel torque command by a value of ½ of the differential control amount, and wherein the controlling of the torque applied to the left wheel and the torque applied to the right wheel includes setting the difference in the torque applied between the left wheel and the right wheel to be the differential control amount.

15. The method of claim 14, wherein, in the left wheel and the right wheel, a turning internal wheel torque command is corrected by subtracting ½ of the differential control amount, and a turning external wheel torque command is corrected by adding ½ of the differential control amount.

16. The method of claim 13, wherein the vehicle driving mode further includes a comfort mode and a sports mode.

17. The method of claim 16, wherein, when the differential control amount in a yaw moment reinforcement direction is defined as a positive control amount, and the differential control amount in a yaw damping direction is defined as a negative control amount, the determining of the differential control amount includes determining the differential control amount to be a negative (−) value when the vehicle driving mode is the comfort mode during the turning of the vehicle, and determining the differential control amount to be a positive (+) value when the vehicle driving mode is the sports mode during the turning of the vehicle.

* * * * *